United States Patent [19]

Fremont

[11] Patent Number: 4,740,969
[45] Date of Patent: Apr. 26, 1988

[54] METHOD AND APPARATUS FOR RECOVERING FROM HARDWARE FAULTS

[75] Inventor: Michael J. Fremont, Palo Alto, Calif.

[73] Assignee: Hewlett-Packard Company, Palo Alto, Calif.

[21] Appl. No.: 879,244

[22] Filed: Jun. 27, 1986

[51] Int. Cl.⁴ .............................................. G06F 11/00
[52] U.S. Cl. ...................................... 371/12; 364/200;
371/16; 371/29
[58] Field of Search ........................ 371/16, 18, 12, 29,
371/19; 364/200, 900

[56] References Cited

U.S. PATENT DOCUMENTS

| | | | |
|---|---|---|---|
| 3,564,506 | 2/1971 | Bee et al. | 371/12 X |
| 3,654,448 | 4/1972 | Hitt | 371/12 |
| 3,736,566 | 5/1973 | Anderson et al. | 371/12 X |
| 3,784,801 | 1/1974 | Caputo et al. | 371/12 |
| 3,937,938 | 2/1976 | Matthews | 371/29 |
| 4,044,337 | 8/1977 | Hicks et al. | 364/200 |
| 4,459,658 | 7/1984 | Gabbe et al. | 364/200 |
| 4,514,846 | 4/1985 | Federico et al. | 371/16 |
| 4,594,710 | 6/1986 | Matsunoshita et al. | 371/16 |

Primary Examiner—Charles E. Atkinson
Attorney, Agent, or Firm—Douglas L. Weller

[57] ABSTRACT

A method and apparatus for recovery from a fault occurring within a computing system using a hardware recovery module comprising a microprocessor dedicated for recovery control and a memory for storing system states. A recovery counter counts machine instructions executed since a previously recorded initial checkpoint. Each time the CPU transfers information directly from an I/O controller or the cache memory the recovery module stores the data being transferred. Each time an interrupt is made to the CPU, the recovery module is notified of the interrupt, and it thereupon stores the count of machine instructions executed since the previously recorded initial checkpoint and information identifying the interrupt. When a fault is detected, the system is restored to the system state existing at the beginning of the checkpoint, and the processor synthetically executes the machine instructions originally executed after the initial checkpoint in a sequence substantially similar to the original sequence. During synthetic execution, the recovery module simulates the original inputs, suppresses outputs, and records completion of pre-fault I/O requests. Synthetic execution is abandoned when the instruction point at which the fault was detected is reached, true execution resumes, and the recovery module thereafter simulates the completion of pre-fault I/O requests.

33 Claims, 7 Drawing Sheets

METHOD AND APPARATUS FOR RECOVERING FROM HARDWARE FAULTS

BACKGROUND OF THE INVENTION

The present invention relates to error recovery in a computing system and, more particularly, to transparent recovery from a hardware fault detected within a computing system.

A fault which occurs during execution of machine instructions in a computing system often renders data or subsequent execution of machine instructions invalid. Rather than halt operation entirely and restart the computing system, it is desirable to recover from the fault and continue processing with a minimum amount of disruption while ensuring that data and subsequent execution of machine instructions will be valid.

Software recovery techniques are known. In one such technique, software periodically records enough data to completely restore the system to a checkpoint where the system state is known to be valid for all operating purposes. When a fault is detected, file modifications performed since the last checkpoint must be undone, the computing system is reset to the last checkpoint, and the system is restarted from that point.

However, such a technique is not transparent to the user because the user is required to insert programming code at a proper place in the program to record enough information to restore the system to a valid state. Since the scheme requires the user to select which information to record at each checkpoint and at which time, it is prone to human error. If the checkpoint code is misplaced, needed data may be overwritten or otherwise lost before proper recording.

Another disadvantage of this technique is the requirement of almost constant interaction between the gram and the operating system which seriously degrades operating system efficiency. Furthermore, once the fault is detected, the process must be reversed until the last checkpoint is reached. This seriously degrades recovery time, particularly in large systems where large file structures must be modified.

Another recovery scheme uses modular redundancy. In this scheme, two or more processors execute identical code in parallel. At periodic checkpoints, the results from the two processors are compared. If the results are found to differ, an arbitration scheme chooses between the two results. The duplication of hardware is almost always cost prohibitive, and the extra hardware creates the possibility of a greater number of fault occurrences.

SUMMARY OF THE INVENTION

According to the invention, a method and apparatus provides for fault recovery of a computing system by using a hardware recovery module appended to the Central Processing Unit (CPU) for recording and restoring transient system states during periods between periodic checkpoints where the system state is known to be valid for all operating purposes. Fault recovery is transparent to application software operating in the computing system. The invention provides recovery with minimum interaction with the operating system, quick recovery time, and minimum process throughput degradation.

In one embodiment of the present invention, a hardware recovery module comprises a microprocessor dedicated for recovery control and a memory for storing system states. The hardware module is for monitoring a computing system having a CPU, a main memory, a cache memory, and I/O devices. The recovery module performs checkpointing and related operations in parallel with normal system operation and independently of the application programs.

As used herein, a checkpoint comprises an initial checkpoint recorded at the beginning of a checkpoint interval and information regarding all information transfers to the CPU occurring within the computing system after the initial checkpoint and until the end of the checkpoint interval. The length of a checkpoint interval is determined by the amount of storage in the hardware recovery module for recording checkpoint data. A new checkpoint interval begins whenever the available storage is nearly full or at some other time which may be predetermined by a programmer.

An initial checkpoint comprises data in the CPU registers and old data in the cache memory at the beginning of the checkpoint. Old data is data which has been modified by the CPU but which has not yet been checkpointed. An information transfer occurs each time the CPU transfers data to itself, from the cache memory or directly from an I/O controller and each time the CPU is notified of an interrupt.

In a specific method according to the invention, an initial checkpoint is recorded and the CPU begins executing a sequence of machine instructions. During execution a recovery counter counts executed machine instructions. Whenever an information transfer to the CPU occurs within the computing system, the recovery module stores the data being transferred. Similarly, whenever the CPU is interrupted the recovery module detects the interrupt and thereupon stores the interrupt information, and the value of the recovery counter. This process continues until the end of the checkpoint interval at which time the checkpoint is validated and a new checkpoint interval begins.

When a fault is detected, system operation is temporarily suspended. Thereupon, the reads which have been stored in the recovery module are read out in reverse chronological order and written back to the main memory to restore the main memory to the state needed by the process to be reexecuted (reexecution only requires that the main memory be restored to a state consistent with the one the process originally detected), the cache memory is purged, and the processor is reloaded with its initial CPU register values.

Next, the processor is reinitiated at the most recently validated checkpoint. The processor is then caused to synthetically execute all machine instructions originally executed after the checkpoint. That is, the processor reexecutes the machine instructions in substantially the same sequence as the original execution, except that I/O outputs are suppressed as unnecessary, and I/O inputs are simulated by recovering the original inputs from the recovery module memory. The stored recovery counter values are used to determine the proper time for interrupts to take place during reexecution.

When the processor reaches the point at which the fault occurred, true execution resumes. All I/O is thereafter actually performed, the checkpoint process running at the time the fault occurred is continued, and an interrupt is generated to the now normally-running process to inform the operating system of the fault point and the recovery status. The operating system can then determine if the user had specified an application-dependent recovery routine and execute it accordingly.

If another fault occurs during the recovery process, recovery can be retried without loss of critical information, since all of the necessary data still resides in the system state memory. Alternatively, recovery from a fault occurring during recovery can be effected on alternate hardware.

The invention will be better understood by reference to the following detailed description taken in conjunction with the accompanying drawings.

BRIEF DESCRIPTION OF THE DRAWINGS

FIG. 4 is a flowchart depicting steps taken during normal processing according to the invention.

DETAILED DESCRIPTION OF THE PREFERRED EMBODIMENTS

Figure 1:
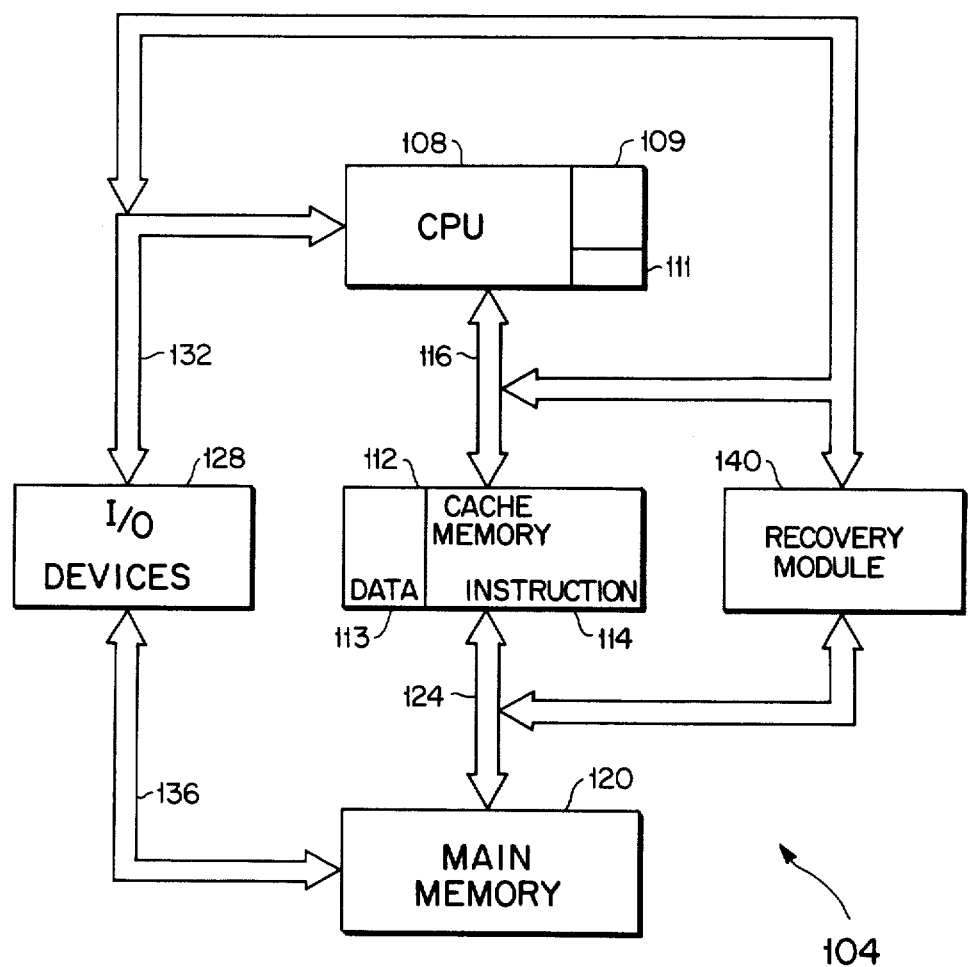
FIG. 1 is a diagram illustrating a computing system in accordance with the present invention.

FIG. 1 shows a computing system according to the present invention generally designated as 104. Computing system 104 includes a CPU 108 having a plurality of CPU registers 109 and a recovery counter 111 for counting executed machine instructions. A cache memory 112 comprising a data cache 113 and an instruction cache 114 is connected to CPU 108 by a cache-CPU bus 116. A main memory 120 is connected to cache memory 112 by a memory-cache bus 124. One or more I/0 devices 128 are connected to CPU 108 by an I/O-CPU bus 132 and to main memory 120 by an I/O-main memory bus 136. A recovery module 140 is connected to cache-CPU bus 116, memory-cache bus 124, and I/O-CPU bus 132.

Figure 2:
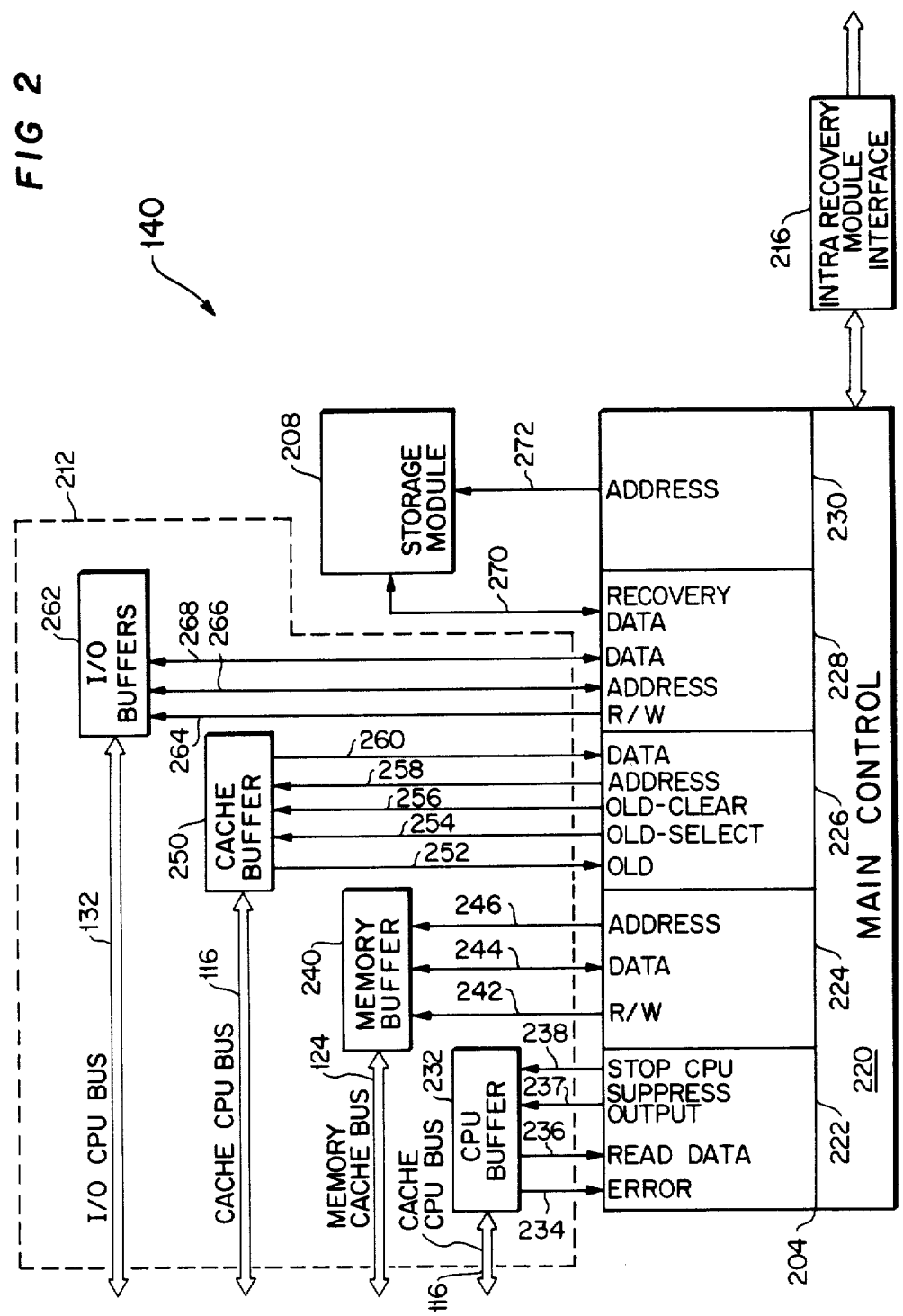
FIG. 2 is a detailed illustration of one embodiment of a recovery module according to the invention as shown in FIG. 1.

FIG. 2 is a block diagram illustrating details of recovery module 140. Recovery module 140 comprises a recovery control module 204, a storage module 208, a plurality of system buffers 212 and an intrarecovery-module interface 216. Recovery control module 204 comprises a microprocessor dedicated for recovery control including a main control 220, a CPU control 222, a main memory control 224, a cache memory control 226, a system multiplexer 228, and an address control 230. In all cases the connections shown are by way of example only. It is contemplated that there will most likely be other lines, not shown, which provide control and other signals to the individual components. These lines are not shown because they vary from machine to machine and are matters of routine engineering skill.

CPU control 222 is coupled to the CPU-cache bus 116 through a CPU buffer 232. CPU buffer 232 monitors CPU registers 109 to control recovery processing. In particular, an error signal is transmitted to CPU control 222 via an error signal line 234 whenever any CPU hardware detects a hardware fault. CPU control 222 is notified to read data during an information transfer or an interrupt via a read data line 236, so that recovery module 140 may locate the data of interest and save it in storage module 208. The information may be in bit serial or byte parallel format, or it may be multiplexed over one line as the circumstances require. A suppress output line 237 is for instructing CPU 108 to suppress output during recovery processing. Finally, a stop CPU 238 line is for transmitting a signal to CPU 108 which causes CPU 108 to stop instruction execution so that recovery processing may be effected after a fault has been detected.

Main memory control 224 is coupled to memory-cache bus 124 through a main memory buffer 240. During normal CPU operation, main memory control 224 is responsible for monitoring all main memory/cache data transfers. During recovery processing, main memory control 224 controls restoration of main memory 120 for reexecution. Accordingly, main memory control 224 includes a read/write line 242 for selectively indicating the mode of operation to main memory buffer 240. A data line 244 and an address line 246 are for transmitting data and address information between main memory control 224 and main memory buffer 240. The address and/or data may be transferred over the lines in bit serial or byte parallel format, or they may be multiplexed over one line as circumstances require. When necessary, main memory control 224 may transfer main memory contents to another computer through intrarecovery-module interface 216.

Cache control 226 is connected to cache-CPU bus 116 by a cache buffer 250. Cache control 226 is for controlling the reading of old data from the cache independently of CPU 108. Old data is data in the cache which has been modified by CPU 108, but which has not yet been checkpointed. A pair of bits in each cache line indicate when the data in that cache line is old. Only one bit is used per checkpoint interval. Two bits are provided to allow cache control 226 to read old data from a previous checkpoint interval during a subsequent checkpoint interval. Thus, the checkpoints are double buffered. Details of operation shall be discussed later.

An old-indicator line 252 is for providing cache control 226 with the value of the old bit selected. An old-select line 254 is for selecting which old bit in the cache line to read. An old-clear line 256 is for resetting the value of the selected old bit after the contents of the selected cache line have been stored in storage module 208. An address line 258 is for selecting the address of the cache line to be read, and a data line 260 is for communicating the data from the cache line selected to storage module 208. The address and/or data may be transferred over the lines in bit- serial or byte-parallel format, or they may be multiplexed over one line as circumstances require.

A system multiplexer 228 is coupled to I/O-CPU bus 132 through an I/O buffer 262. System multiplexer 28 is also internally connected to CPU control 222, main memory control 224, and cache control 226 for selectively transmitting data from these modules to storage module 208. A read/write line 264 is for indicating the mode of operation to I/O buffer 262, and an address line 266 and a data line 268 are for transmitting address and data respectively between system multiplexer 228 and I/O buffers 262. A recovery data line 270 is for communicating the data selected from CPU control 222, main memory control 224, cache control 226, or I/O buffers 262 into storage module 208. The address and/or data may be transferred over the lines in bit-serial or byte-parallel format, or they may be multiplexed over one line as circumstances require.

Address control 230 is coupled to storage module 208 through an address line 272. Address control 230 is used during recovery processing for selectively retrieving data from storage module 208.

OPERATION

Figure 3:
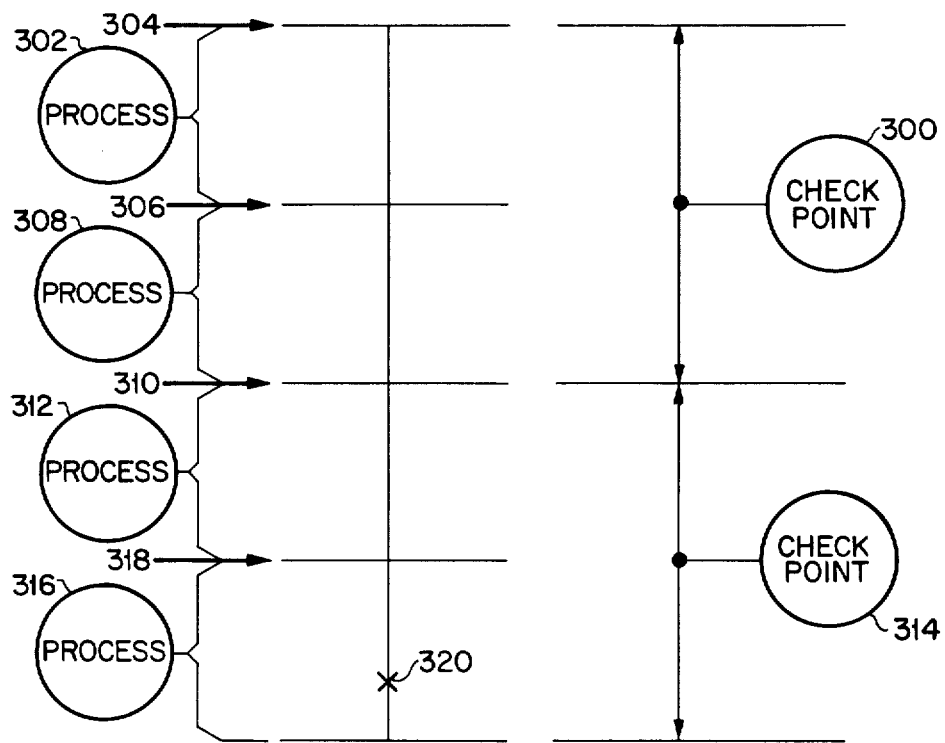
FIG. 3 is a flowchart depicting steps taken during execution of machine instructions according to the invention to prepare for system recovery.
Figure 1:
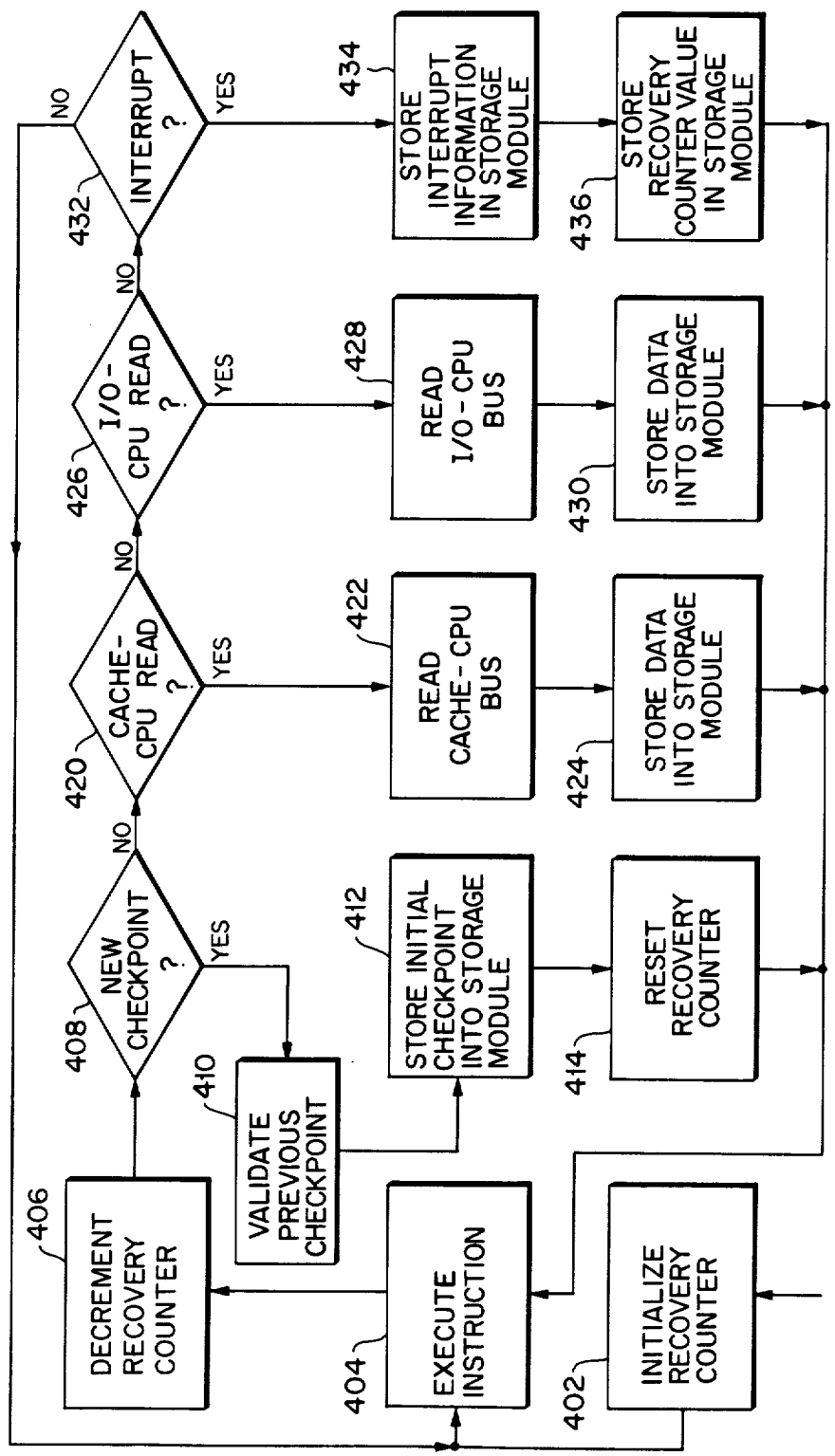

FIG. 3 depicts steps taken during execution of machine instructions according to the invention to prepare for system recovery. In this figure, a checkpoint 300 starts (i.e. the initial checkpoint is recorded) at the beginning of the invocation of a process 302 at a time 304. A checkpoint interval is not defined by the execution of a process to completion, but rather it is determined by the storage capabilities of storage module 208 or by a predetermined time set by a programmer. Thus, checkpoint 300 continues past the completion of process 302 at a time 306 and through process 308. At a time 310, the checkpoint is completed and validated. At time 310, a process 312 is invoked. Simultaneously, a new checkpoint 314 begins. A new process 316 begins at a time 318 and continues until a time 320, at which point a fault occurs. The system is reset to time 304, the beginning of the most recently validated checkpoint, and the original processes are synthesized.

FIG. 4 depicts steps taken during normal processing according to the invention. As shown therein, recovery counter 111 is set to a specified initial value in a step 402. Machine instructions are executed by CPU 108 in a step 404, and recovery counter 111 is decremented for each machine instruction executed in a step 406.

It is ascertained in a step 408 whether it is time for a new checkpoint. The time for a new checkpoint is when storage module 208 is substantially filled with checkpoint data or at some other time which may be determined by a programmer. When it is time for a new checkpoint, the previous checkpoint is completed and validated in a step 410, an initial checkpoint is stored in storage module 208 in a step 412, recovery counter 111 is reset in a step 414, and processing resumes in step 404.

For optimum performance, the system should not be stopped to copy the old data existing in the cache at the beginning of each checkpoint interval. Instead, old data existing in the cache at the end of a particular checkpoint interval is checkpointed during the subsequent checkpoint interval. To accomplish this, a pair of bits in each cache line indicates when the data in that cache line is old. Only one bit is used per checkpoint interval and this bit is set whenever the CPU modifies the data in that cache line. The two bits are provided to allow cache control 226 to read old data from a previous checkpoint interval during a subsequent checkpoint interval. During normal processing, cache control 226 selects the old bit for that checkpoint interval via old-select line 254. Cache control 226 scans the data cache 113 linearly from top to bottom, looking for set old bits. When it detects a set old bit, indicating data in the cache that has been modified but not checkpointed, cache control 226 stores the line in storage module 208 during instruction fetch cycles. After the line is stored, cache control 226 resets the old bit via old-clear line 256 and resumes scanning. If the processor attempts to modify old data that is not yet checkpointed, CPU control 222 stops CPU 108, the data is checkpointed, and the old bit is reset before the write occurs. Similarly, if an old line is selected for writing to main memory (e.g., to make free space available in the cache). The line is copied to storage module 208, and the old bit is reset. Finally, if the end of the checkpoint interval is reached before all old lines are stored, the CPU 108 may be stopped and the remaining data checkpointed. In this way, we guarantee that, after some amount of time, all old data is checkpointed. After all the modified data in the cache has been checkpointed, the old checkpoint is logically replaced by the just completed one, and a new checkpoint is begun. Thus, there is always a checkpoint on which to fall back.

If it is not time for a new checkpoint, it is then ascertained in a step 420 whether a cache-CPU read is being performed. If so, recovery module 140 reads the data being transferred over cache-CPU bus 116 in a step 422, the data being transferred is stored in storage module 208 in a step 424, and processing resumes in step 404.

If a cache-CPU read did not occur, then it is ascertained in a step 426 whether a direct I/O-CPU read is being performed in a step 426. A direct I/O-CPU read occurs whenever CPU 108 requests and receives data from an 1/0 device 128 during a single execution of a machine instruction. If so, recovery module 140 reads the data from 1/0-CPU bus 132 in a step 428, the data being transferred is stored in storage module 208 in a step 430, and processing resumes in a step 404.

If no direct I/O-CPU read occurred, then it is ascertained in a step 432 whether an interrupt has occurred. An interrupt occurs whenever the CPU performs an indirect I/O-CPU read (i.e., a read which is requested by the CPU during the execution of one machine instruction and which generates a completion interrupt by the I/O device to the CPU during the execution of a subsequent machine instruction, or a non-repeatable input such as input from a keyboard) and for other reasons which depend on the system design. In this embodiment, all interrupts are logged during normal operation, and they are distinguished during recovery processing to determine if they are needed by the system for proper recovery. If an interrupt occurred, information about the interrupt (e.g., the type of interrupt, etc.) is stored in storage module 208 in a step 434, the value of recovery counter 111 is stored in a step 436, and processing resumes in step 404.

If an interrupt was not generated, processing resumes in step 404.

Figure 5A:
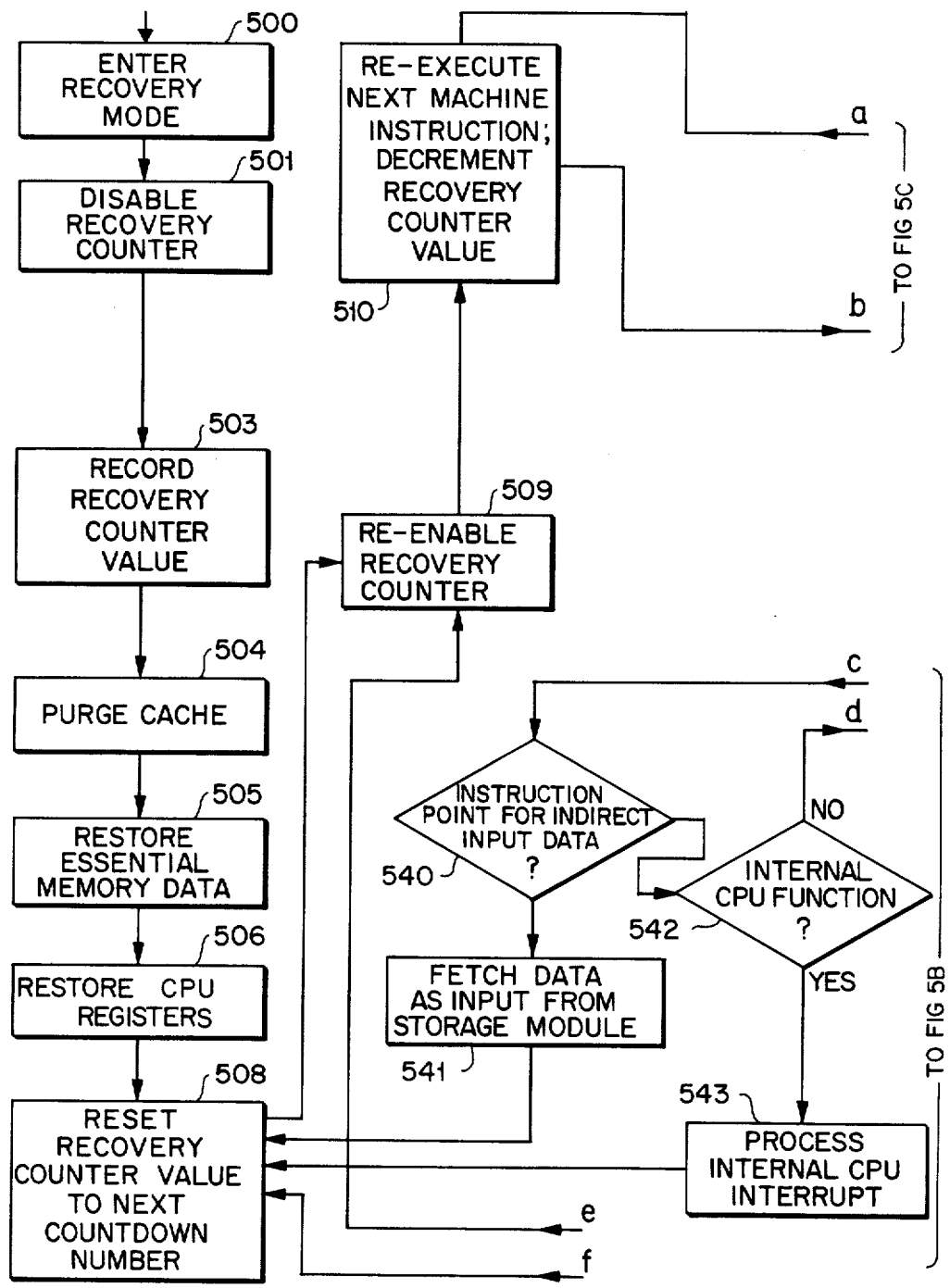
FIGS. 5A-5C are a flowchart depicting steps taken following fault detection to achieve fault recovery according to the invention.
Figure 5B:
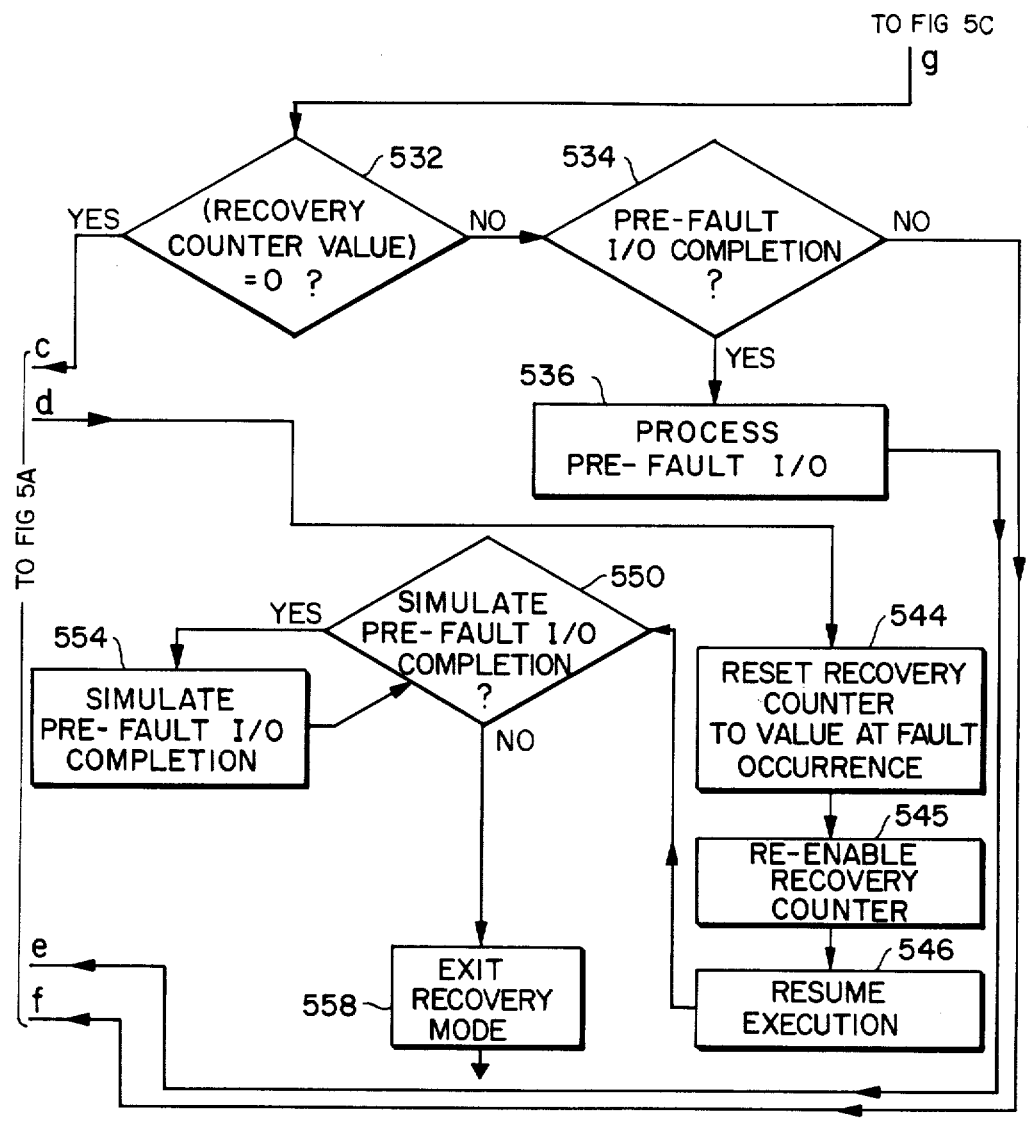
Figure 5C:
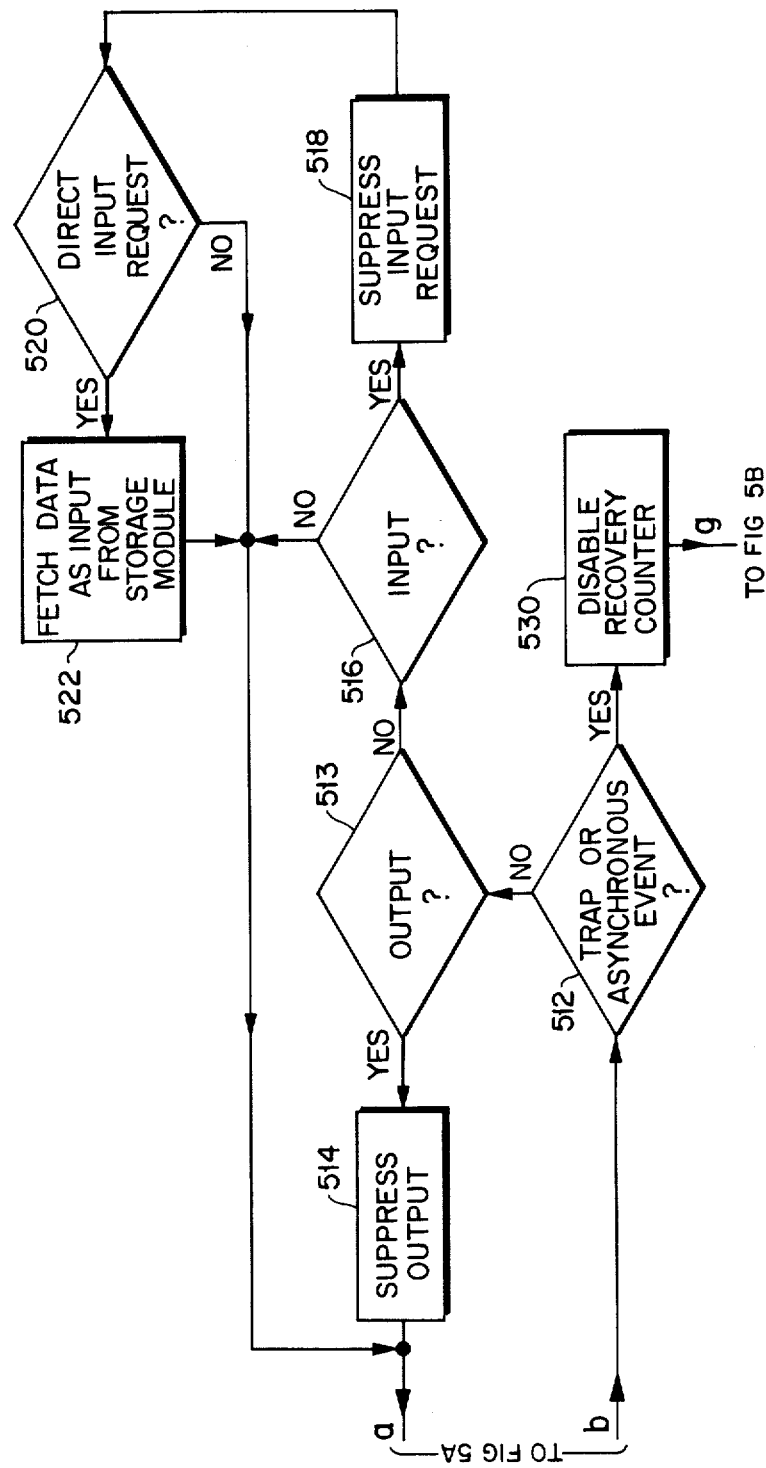

FIGS. 5A-5C depict recovery steps taken by computing system 104 upon detection of a fault. Recovery mode is entered in a step 500 after an error signal is detected on error line 234. Recovery counter 111 is temporarily disabled in a step 501, and the value of recovery counter 111, existing at fault detection, is recorded in a step 503. Cache Memory 112 is purged in a step 504, essential main memory data is restored in a step 505 by retrieving the memory-to-cache reads stored in storage module 208 in reverse chronological order and writing them back to memory, and the CPU registers are restored to CPU 108 in a step 506. Essential main memory data is only that data which is required for reexecution. The remainder of the memory contents remains valid for subsequent execution.

Recovery counter 111 is reset in a step 508 to a count of machine instructions which must be executed to reach an instruction point identical to an instruction point at which a specified interrupt or fault occurred in the original execution sequence. The count of machine instructions is called the countdown number, and a countdown number is determined from the previously recorded recovery counter values.

In a step 509, recovery counter 111 is reenabled. A machine instruction is reexecuted by CPU 108, and recovery counter 111 is decremented with each machine instruction reexecuted in a step 510. The sequence of machine instructions reexecuted are substantially identical to the machine instructions originally executed. Machine instructions are reexecuted in step 510 until a trap or an asynchronous event occurs. A trap is an interrupt generated by recovery counter 111 whenever recovery counter 111 contains a prescribed value. In this embodiment, a trap is generated whenever recovery counter 111 counts down to zero. An asynchronous event is an interrupt which occurs as a result of the completion, during recovery processing, of I/O requested before the fault was detected.

If a trap or an asynchronous event does not occur in a step 512, it is ascertained in a step 513 whether the CPU is about to perform an output. If so, CPU control 232 transmits a signal on suppress output line 237 to CPU 108 which instructs CPU 108 to suppress the output in a step 514 and processing resumes in step 510. Alternatively, CPU 108 may be designed to recognize a recovery processing mode and automatically suppress output without recovery module 140 intervention.

If the CPU was not attempting to perform an output, it is ascertained in a step 516 whether an input request is being made by CPU 108 to an I/O device 128. If so, the request is suppressed in a step 518. If it is ascertained in a step 520 that a direct input request was made, then recovery module 140 initiates a fetch of the requested data from storage module 208 and simulates the input in a step 522. Otherwise, processing resumes in step 510.

Input simulation may be accomplished in many different ways. In one method CPU control 222 asserts stop CPU line 238 whereupon CPU processing is temporarily stopped. Main control 220 then fetches the input data from storage module 208, formats the data and places it on I/O-CPU bus 132. Stop CPU line is disasserted, recovery module 140 interrupts CPU 108, and the input data is processed as it was during the original execution.

Alternatively, CPU 108 may be designed to recognize a recovery processing mode and automatically reroute the direct input request to the recovery module.

If a trap or an asynchronous event occurs in a step 512, recovery counter 111 is disabled in a step 530, and the value of recovery counter 111 is checked in a step 532.

If it is determined that the value of recovery counter 111 is non-zero, it is ascertained in a step 534 whether the interrupt was generated by the completion of a pre-fault indirect I/O request. During original execution, processes may request indirect I/O operations to begin. Because of the latency of the I/O devices and their asynchronous operation with respect to the CPU, it is likely that indirect I/O operations will be in progress when a fault occurs and continue during recovery.

There are two complications encountered if indirect I/0 is allowed to continue during recovery processing. The first is that the indirect I/O may cause completion or other interrupts which must be dealt with by the recovery software. The second is that indirect I/O inputs may overwrite data needed during recovery, e.g., because the page was reassigned after use during original processing. Thus, the interrupt must be processed by recovery module 140 so that a dispatch change does not occur, necessary communication with the interrupting module is performed (e.g., the interrupt is acknowledged) and the interrupt is not posted to the operating system immediately. Additionally, the operating system must not free pages immediately upon disuse during the checkpoint interval, as it might normally do. Instead, pages that were freed would be put on a pre-freed list, and pages on the pre-freed list would be freed after the checkpoint is validated and discarded. After the pre-fault I/O is processed in a step 536, recovery counter 111 is reenabled in step 509, and processing resumes.

If recovery counter 111 has counted down to zero, then an instruction point has been reached where an interrupt occurred during the original execution. If it is ascertained in a step 540 that the interrupt corresponds to the completion of an indirect input request, then recovery module 140 initiates a fetch of the input data from storage module 208 and simulates the input in a step 541.

After input simulation, recovery counter 111 is reset to the next countdown number in step 508, and processing resumes.

If the interrupt was not generated by the completion of an indirect input request, then it is ascertained in a step 542 whether the interrupt was generated as a result of an internal CPU function not requiring recovery module 140 action. An internal CPU function is an operation which naturally recurs during reexecution and which does not need to be simulated by the recovery module during reexecution (e.g. a divide by zero). If so, the internal CPU interrupt is processed by the CPU (e.g. ignored by recovery module 140) in a step 543. Recovery counter 111 is reset to the next countdown number in step 508, and processing resumes.

If an internal interrupt is not being made by CPU 108, then the point at which the fault was detected has been reached. The recovery counter 111 is reset to the value which existed at fault occurrence in a step 544, the recovery counter is reenabled in a step 545, and true execution resumes in a step 546.

Although CPU 108 now resumes normal operation, recovery module 140 remains in recovery mode since it is necessary to simulate completion of those prefault I/O requests which were completed during recovery processing. If it is ascertained in a step 550 that prefault I/O completion must be simulated, then recovery module 140 interrupts the processor and simultaes the completion of each prefault I/O in a step 554. Software in CPU 108 recognizes the prefault I/O completion interrupts and modifies its execution if necessary. After all prefault I/O completion interrupts have been simulated, recovery module 140 exits recovery mode in a step 558.

CONCLUSION AND ALTERNATIVE EMBODIMENTS

While the above is a complete description of one embodiment of the present invention, various modifications may be employed. For example, main control 220 may be programmed to format and display the contents of storage module 208 when a fault is detected. This may prove to be a valuable diagnostic tool, since the dynamic system state has been recorded during an interval of time preceding the fault. Process execution may thus be traced from the initial state up until the time the fault was detected to aid debugging.

Consequently, the description should not be used to limit the scope of the invention which is properly set out in the claims.

I claim:

1. An apparatus useful in the recovery from faults within a computing system, the apparatus comprising:

counting means for counting executed machine instruction; and checkpoint recording means, including means for recording a value of the counting means, for recording wherein the checkpoint comprises an initial checkpoint and information transfers occurring during a checkpoint interval, the initial checkpoint comprising data in central processor unit registers and data in cache memory at the beginning of the checkpoint interval, and the information transfers comprising, during the checkpoint interval, data transferred directly to the central processor unit from an I/O controller, data transferred to the central processor unit from the cache memory, and data from an interrupt to the central processign unit.

2. An apparatus as in claim 1 further comprising means for selectively engabling and disabling the counting means.

3. An apparatus as in claim 1 further comprising means for setting the counting means to a precribed value.

4. An apparatus as in claim 1 further comprising means for generating a trap when the counting means contains a prescribed value.

5. An apparatus as in claim 1 further comprising means for restoring the computing system to a system state existing at the beginning of the checkpoint.

6. An apparatus as in claim 5 further comprising means for processing the recurrence of a request for input by the central processing unit from an input device during a synthetic execution of a series of machine instructions.

7. An apparatus as in claim 6 wherein the input request processing means includes means for simulating direct inputs from an input device to the central processor unit.

8. An apparatus as in claim 5 further comprising means for suppressing output by the central processing unit during a synthetic execution of a series of machine instructions.

9. An apparatus as in claim 5 further comprising means for processing, during a synthetic execution of a series of machine instructions, a completion of a request for I/O made by the central processing unit to an I/O device before the synthetic execution of the series of machine instructions.

10. An apparatus as in claim 9 further comprising means for simulating the completion of the I/O request after the synthetic execution of the series of machine instructions.

11. An apparatus as in claim 5 wherein the restoring means includes means for restoring, to main memory, data necessary for the synthetic execution of the series of machine instructions.

12. An apparatus as in claim 1 wherein the checkpoint recording means includes means for recording old data comprising data existing in a cache memory at the end of a checkpoint interval which has been modified by the central processor unit but which has not been recorded by the checkpoint recording means.

13. An apparatus as in claim 12 wherein the old data recording means includes means for recording, during a subsequent checkpoint interval, old data existing in a cache memory at the end of a previous checkpoint interval.

14. An apparatus as in claim 13 further comprising:

means for detecting a prescribed amount of data within the checkpoint recording means;

means for stopping an execution of machine instructions by the computing system unit when the prescribed amount of data is detected; and means for completing the recording of the old data existing in the cache memory at the end of the previous checkpoint interval.

15. A method of preparing for recovery from a fault detected within a computing system comprising the steps of:

recording an initial checkpoint, the initial checkpoint comprising data in central processor registers and data in a cache memory at the beginning of a checkpoint interval;

counting machine instructions executed after recording the initial checkpoint; and recording information transfers occurring after recording the initial checkpoint, the information transfers comprising, during the checkpoint interval, data transferred directly to the central processor unit from an I/O controller, data transferred to the central processor unit from the cache memory, and data from an interrupt to the central processing unit.

16. A method as in claim 15 wherein the information transfer recording step includes the step of recording the count of machine instructions executed.

17. A method as in claim 15 wherein the initial checkpoint recording step includes the step of recording old data comprising data existing in a cache memory at the end of a checkpoint interval which has been modified by the central processor unit but which has not been recorded.

18. A method as in claim 17 wherein the old data recording step comprises recording, during a subsequent checkpoint interval, old data existing in a cache memory at the end of a previous checkpoint interval.

19. A method as in claim 17 further comprising the steps of:

detecting a prescribed amount of data in a checkpoint recorder;

stopping execution of machine instructions in the computing system; and completing the recording of old data existing in the cache memory at the end of the previous checkpoint interval.

20. A method useful in the recovery from a fault occurrence within a computing system, the method comprising the steps of:

restoring the computing system to a system state existing at the beginning of a checkpoint;

executing synthetically machine instructions, originally executed in an execution sequence, in a reexecution sequence, wherein the reexecution sequence is substantially similar to the execution sequence; and repeating inputs from an I/O controller to a central processor unit, originally occurring in an order in the execution sequence, in an identical order in the reexecution sequence.

21. A method as in claim 20 wherein the input repeating step comprises the step of simulating the input.

22. A method as in claim 20 further comprising the step of repeating outputs, originally occurring in an order in the execution sequence, in an identical order in the reexecution sequence wherein the output repeating step comprises the step of suppressing the outputs.

23. A method as in claim 20 wherein the machine instructions are synthetically executed in an order identical to the original execution sequence.

24. A method as in claim 22 further comprising the steps of:
repeating each input which occurred after the beginning of the checkpoint and before the fault occurrence; and
repeating each output which occurred after the beginning of the checkpoint and before the fault occurrence wherein the output repeating step comprises the step of suppressing the outputs.

25. A method as in claim 24 further comprising the step of:
repeating each input and output at an instruction point in the reexecution sequence identical to an instruction point in the execution sequence at which each input and output originally occurred.

26. A method as in claim 25 wherein the step of repeating each input includes calculating the number of machine instructions executed between each interrupt to the central processing unit in the execution sequence for repeating indirect inputs to the central processing unit.

27. A method as in claim 26 wherein the step of repeating each input includes the step of generating a trap at the instruction point in the reexecution sequence identical to an instruction point in the execution sequence at which an interrupt corresponding to the completion of an indirect input request originally occurred.

28. A method as in claim 20 further comprising the step of:
processing, during the synthetic execution of machine instructions, a completion of a request for I/O made by the central processing unit to an I/O device before the synthetic execution of the series of machine instructions.

29. A method as in claim 28 further comprising the step of:
abandoning the synthetic execution of machine instructions if an instruction point, identical to an instruction point at which the fault occurrence took place, has been reached.

30. A method as in claim 29 further comprising the step of:
simulating the completion of the I/O request made by the central processing unit before the synthetic execution of the series of machine instructions after abandoning the synthetic execution of machine instructions.

31. A method as in claim 20 wherein the restoring step includes restoring, to main memory, data necessary for the synthetic execution of the series of machine instructions.

32. A method of preparing for and recovering from a fault detected a computing system comprising the steps of:
recording an initial checkpoint, the initial checkpoint comprising data in central processor registers and data in a cache memory at the beginning of a checkpoint interval;
counting machine instructions executed after recording the initial checkpoint;
recording information transfers occurring after recording the initial checkpoint, the information transfers comprising, during the checkpoint interval, data transferred directly to the central processor unit from an I/O controller, data transferred to the central processor unit from the cache memory, and data from an interrupt to the central processing unit;
restoring the computing system to a system state existing at the beginning of a checkpoint;
executing synthetically machine instructions, originally executed in an execution sequence, in a reexecution sequence, wherein the reexecution sequence is substantially similar to the execution sequence; and
repeating inputs, originally occurring in an order in the execution sequence, in an identical order in the reexecution sequence.

33. A method for diagnosing a fault detected within a computing system comprising the steps of:
recording in a checkpoint recorder an initial checkpoint, the initial checkpoint comprising data in central processor registers and data in a cache memory, at the beginning of a checkpoint interval;
counting machine instructions executed after recording the initial checkpoint;
recording in the checkpoint recorder information transfers occurring after recording the initial checkpoint, the information transfers comprising, during the checkpoint interval, data transferred directly to the central processor unit from an I/O controller, data transferred to the central processor unit from the cache memory, and data from an interrupt to the central processing unit; and
displaying, at a prescribed time, the contents of the checkpoint recorder existing during the fault occurrence.

* * * * *